G. Smith,

Milking Stool.

No. 113,806.   Patented Apr. 18. 1871.

Witnesses.   Inventor

United States Patent Office.

GEORGE SMITH, OF ROCHESTER, NEW YORK.

Letters Patent No. 113,806, dated April 18, 1871.

IMPROVEMENT IN MILKING-STOOLS.

The Schedule referred to in these Letters Patent and making part of the same.

*To all whom it may concern:*

Be it known that I, GEORGE SMITH, of Rochester, in the county of Monroe and State of New York, have invented a new and improved Milking-Stool; and I do hereby declare that the following is a full, clear, and exact description thereof, reference being had to the accompanying drawing making part of this specification, in which—

Similar letters of reference indicate corresponding parts in the several figures.

The object of this invention is to improve the milking-stool which is described in the schedule annexed to my Letters Patent numbered 109,847, by the employment of a yielding hoop or yoke in combination with hooks upon the top of the stool, whereby the yoke is firmly held when applied to the stool, and whereby the diameter of the yoke can be enlarged or diminished to adapt it for supporting buckets of different sizes, as will be hereinafter explained.

To enable others skilled in the art to understand my invention, I will explain its construction and operation.

In the accompanying drawing—

Figure 1:
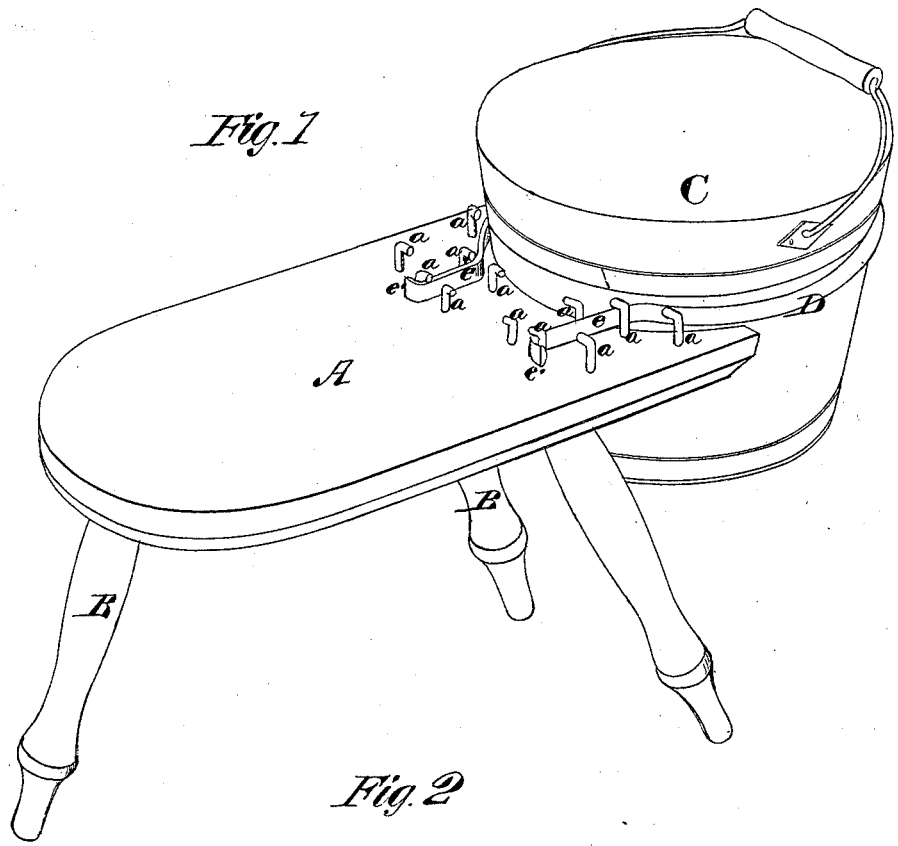
Figure 1 is a perspective view of my improved stool, showing a milk-bucket applied thereto.
Figure 2:
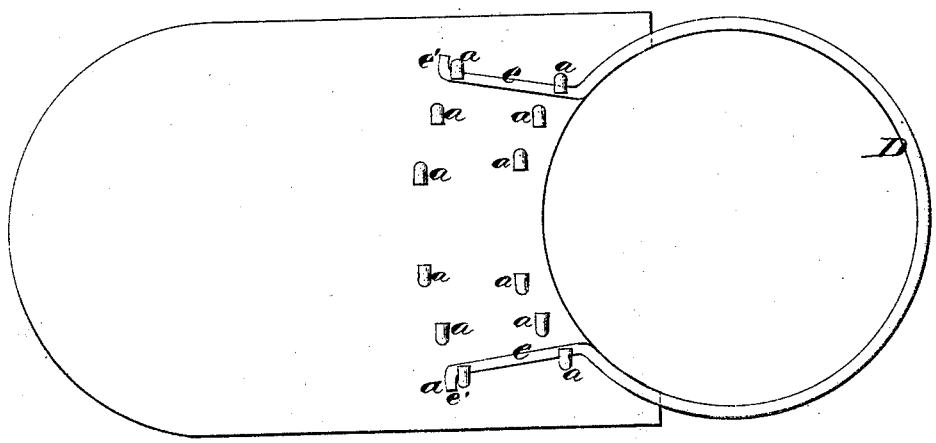
Figure 2 is a top view of the stool and its supporting-yoke.

A represents a stool top, which is mounted on legs B, and which has one end curved out, as shown clearly in fig. 2, to receive against it the convex side of a pail or bucket, C.

On the upper surface of the top of the stool, near that end which is curved out as above described, a number of hooks, *a a*, are inserted and arranged in two rows in the arcs of circles.

These hooks serve as means for holding firmly in place a flexible yoke or supporting-hoop, D, the ends *e e* of which are straightened out and terminated by hooks *e′ e′*.

This yoke D is preferably made of spring metal, so that when it is compressed and its ends adjusted between the hooks *a a* on the stool top, as shown in the drawing, its tendency to recoil will keep the ends *e e* in place beneath the retaining-hooks *a*. When the yoke D is thus held the hooks *e′ e′* on the extremities of its straight portions will prevent the latter from being drawn out of their places endwise.

In the drawing I have represented three sets of hooks, *a*, which are so arranged that they are adapted for holding the yoke D when adjusted for five different diameters of pails; but it is obvious that a greater or lesser number of hooks may be employed without departing from my invention.

It will be seen from the above description that the yoke D, when applied to the hooks *a*, will be firmly held, and will embrace and afford a good support for a pail, C; also that the yoke can be readily made larger or smaller to adapt it for receiving and holding different-sized pails; also that the yoke can be readily detached from the hooks *a*, turned over upon the stool top, and there fastened again to the hooks, thus bringing the parts into a very small space for portability.

I do not lay claim to anything set forth in my Letters Patent numbered 109,847.

Having described my invention,

What I claim as new is—

The spring-hooked yoke D, in combination with one or more sets of retaining-hooks, *a*, on the stool top A, substantially as described.

GEORGE SMITH.

Witnesses:
  J. N. CAMPBELL,
  EDM. F. BROWN.